US010452796B2

(12) United States Patent
Hallquist (10) Patent No.: US 10,452,796 B2
(45) Date of Patent: *Oct. 22, 2019

(54) DYNAMICALLY-POSITIONED SEARCH DOMAIN USED IN NUMERICAL SIMULATION OF AN IMPACT EVENT BETWEEN TWO OBJECTS

(71) Applicant: Livermore Software Technology Corporation, Livermore, CA (US)

(72) Inventor: John O. Hallquist, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/000,956

(22) Filed: Jun. 6, 2018

(65) Prior Publication Data

US 2018/0285502 A1   Oct. 4, 2018

Related U.S. Application Data

(63) Continuation-in-part of application No. 14/288,354, filed on May 27, 2014, now abandoned.

(51) Int. Cl.
*G06F 17/50* (2006.01)
*G06T 17/20* (2006.01)

(52) U.S. Cl.
CPC ...... *G06F 17/5018* (2013.01); *G06F 17/5031* (2013.01); *G06F 17/5095* (2013.01); *G06T 17/20* (2013.01)

(58) Field of Classification Search
CPC ............. G06F 17/5018; G06F 17/5095; G06F 17/5031; G06T 17/20

(Continued)

(56) References Cited

U.S. PATENT DOCUMENTS 7,664,623 B1   2/2010  Hallquist
2008/0247636 A1  10/2008  Davis et al.
(Continued)

OTHER PUBLICATIONS

Varghese et al. "Hierarchical Strategy for Rapid Finite Element Analysis", Apr. 24, 2004, 45th AIAA Structures, Structural Dynamics & Materials Conference, Palm Springs, California 1-12.

(Continued)

*Primary Examiner* — Rehana Perveen
*Assistant Examiner* — Justin C Mikowski
(74) *Attorney, Agent, or Firm* — Roger H Chu (57) ABSTRACT

First model representing a fixed barrier and second model representing an automobile to be improved according to crashworthiness criteria are received in a computer system. Time-marching simulation of an impact event between the first and the second models is conducted. Based on user-specified parameters, a search domain representing three-dimensional space of interest for detecting contacts between first and second objects is established. At each solution cycle, search domain is automatically repositioned without any user interaction, to align with a local coordinate system affixed to the second computerized model that moves and rotates in response to detected contacts. Numerically-calculated structural behaviors obtained in the simulation include effects from detected contacts within the search domain. Any finite element having broken free from the FEA model and being located outside of the search domain is excluded from further detection of contacts and deleted from the calculation in the simulation.

18 Claims, 6 Drawing Sheets

(58) Field of Classification Search
USPC .......................................................... 703/2
See application file for complete search history.

(56) References Cited

U.S. PATENT DOCUMENTS

2008/0265095 A1   10/2008  Lee et al.
2009/0228246 A1    9/2009  Lacome
2010/0161296 A1    6/2010  Wainscott

OTHER PUBLICATIONS

1st USPTO Office Action (U.S. Appl. No. 14/288,354—Parent Application) dated Dec. 19, 2016.
2nd USPTO Office Action (U.S. Appl. No. 14/288,354—Parent Application) dated Jun. 15, 2017.
3rd USPTO Office Action (U.S. Appl. No. 14/288,354—Parent Application) dated Sep. 15, 2017.
4th USPTO Office Action (U.S. Appl. No. 14/288,354—Parent Application) dated Nov. 16, 2017.
5th USPTO Office Action (U.S. Appl. No. 14/288,354—Parent Application) dated Apr. 3, 2018.

DYNAMICALLY-POSITIONED SEARCH DOMAIN USED IN NUMERICAL SIMULATION OF AN IMPACT EVENT BETWEEN TWO OBJECTS

CROSS-REFERENCE TO RELATED APPLICATIONS

This application is continuation-in-part (CIP) of a pending U.S. Patent Applications for the same title, Ser. No. 14/288,354, filed on May 27, 2014.

FIELD

The invention generally relates to computer-aided engineering analysis, more particularly to methods and systems for improving crashworthiness of an automobile by conducting numerical simulation of impact events between two objects using a dynamically-positioned search domain.

BACKGROUND

Producing cars and getting the public to buy them is a demanding and highly competitive business. Manufacturers agonize over ways to make their cars, trucks and SUVs even marginally better than another company's vehicles.

To make sure cars live up to the consumers' standards and one-up competitors, car makers test their cars in all types of environments. While much testing can be done on closed tracks, real-world car testing needs to take place in real-world conditions. By combining data from the track with information gleaned from driving on public roads, automakers use testing to create vehicles that they hope will satisfy the market.

This broad process covers everything from performance and comfort to reliability and safety. It also encompasses quality and appearance. The idea behind car testing is that it allows manufacturers to work out all the kinks and potential problems of a model before it goes into full production. It's much cheaper to eliminate a problem with a product before you begin mass producing it than it is to discover problems and try to fix them afterward.

One of the more well-known tests is crash testing. Slow-motion films are produced for cars being crash tested with dummies inside "playing" car passengers. Depending on the purpose of the film, the mannequin either goes flying through the windshield, or is protected by a car seatbelt and airbag. Manufacturers like to sound the proverbial trumpet when one of their vehicles, especially a family-oriented vehicle, scores well in government and independent crash-safety tests.

Depending on what's being measured or tested, engineers can make changes on the spot. In other cases, test findings may require an extensive rethinking of how a part or set of parts function. To make sure the entire testing process stays reasonably on schedule, manufacturers make multiple "test mules," or pre-production cars, for testing. This way, multiple systems can be designed and experimented with at once.

Testing automobiles is expensive. The automobile prototypes, or test mules, can cost several hundred thousand dollars, even for so-called economy cars. Furthermore, it requires paying the salaries of teams of engineers, paying for the costs of special measuring equipment, and shelling out for meals and accommodations for these small armies when they must conduct their experiments away from their main offices.

In order to save costs for car manufacture, one of methods to reduce the number of crash tests is to computer simulated crash tests. With advance of the computers, a computer related technology called Computer aided engineering (CAE) has been used for supporting engineers in many tasks. For example, in a product design procedure, CAE analysis particularly finite element analysis (FEA) has often been employed to obtain and evaluate simulated structural responses (e.g., stresses, displacements, etc.) under various loading conditions (e.g., static or dynamic).

FEA is a computerized method widely used in industry to simulate (i.e., model and solve) engineering problems relating to complex products or systems (e.g., cars, airplanes, etc.) such as three-dimensional non-linear structural design and analysis. FEA derives its name from the manner in which the geometry of the object (e.g., an automobile) under consideration is specified. The geometry is defined by finite elements (or elements) and nodes. There are many types of elements, solid elements for volumes or continua, shell or plate elements for surfaces and beam or truss elements for one-dimensional structural objects. One of the most challenging tasks is related to numerically simulate an impact event between objects, for example, numerical simulations of automobile crashworthiness.

Car including components can be modified for improvement based on numerically calculated structural behaviors obtained in a numerical simulation. For example, any new physical change or modification in a car design can be numerically verified.

In a time-marching simulation (i.e., a particular kind of numerical simulation) of automobile crashworthiness (e.g., an automobile crashing into a fixed barrier), contacts between an automobile (represented by a FEA model) and a barrier, and self contacts amongst the finite elements of the FEA model must be detected and treated to realistically represent the physical phenomena. As modern computer technology progresses, the average FEA model used in automotive crashworthiness has become larger than ever (e.g., more than five million finite elements). It is becoming common to model cast aluminum parts with highly refined meshes of solid elements, rather than shell or beam elements used in the recent past. Modeling with solid elements allows sophisticated three-dimensional constitutive failure models; consequently, during a simulated crash event, the cast aluminum parts represented with solid elements can fragment creating disjoint debris which interacts in the contact treatment. A single piece of disjoint debris can be represented with one or more finite elements. Once a disjoint debris moves away from the main structure (i.e., the FEA model of the car), it no longer influences the simulation results, but can increase runtime dramatically as the search domain for contacts continuously grows in volume. During the simulation the search domain is modified in global space and is resized to contain the FEA model in its instantaneous state. If the search domain significantly grows, needed computer resources (e.g., computer processing time) required for detecting contacts and tracking finite elements that have broken free from the main structure can become disproportionally large compared to other tasks in the simulation. In certain circumstances, increased computing time can make a simulation impractical (each simulation generally needs to be done with an overnight execution). The need for efficient contact management is readily apparent.

It would therefore be desirable to have methods and systems for efficient contact management in numerical simulation of structural behaviors in an impact event between two objects.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Systems, methods and software product for using a dynamically-positioned search domain in a time-marching numerical simulation for improving automobile crashworthiness are disclosed. According to one aspect of the disclosure, a first computerized model representing a fixed barrier and a second computerized model representing an automobile to be improved according to a set of crashworthiness criteria are received in a computer system, which has a finite element analysis (FEA) application module capable of simulating impact events between two objects installed thereon. A time-marching numerical simulation of an impact event between the first computerized model and the second computerized model is conducted. Based on user-specified parameters, a search domain that covers the three-dimensional space of interest for detecting contacts between first and second computerized models is established. At each solution cycle of the time-marching simulation, the search domain is automatically repositioned, without any user interaction, to align with a local coordinate system affixed to the second computerized model that moves and rotates in response to detected contacts. Physical characteristics of the search domain are constant and unchanged after each repositioning. Numerically-calculated structural behaviors obtained in time-marching numerical simulation include effects from detected contacts within the search domain.

According to another aspect, the second computerized model can be a finite element analysis (FEA) model defined with a number of nodal points connected by finite elements. Any debris (represented by one or more finite elements) broken free from the FEA model and located outside of the search domain is excluded from further contact detection. Further, the finite elements contained within the debris, which fall outside the search domain, are deleted from the calculation in the simulation. If the disjoint debris intersects the boundary of the search domain, the deletion or inclusion can be controlled by a user-defined option.

According to yet another aspect, physical design of the automobile is modified based on the numerically-calculated structural behaviors in order to satisfy the set of crashworthiness criteria. For example, one or more components of the automobile can be changed or adjusted by engineers/scientists with insights gained on the results of the time-marching numerical simulation.

Objectives, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1-6. However, those skilled in the art will readily appreciate that the detailed description given herein with respect to these figures is for explanatory purposes as the invention extends beyond these limited embodiments.

Figure 1:
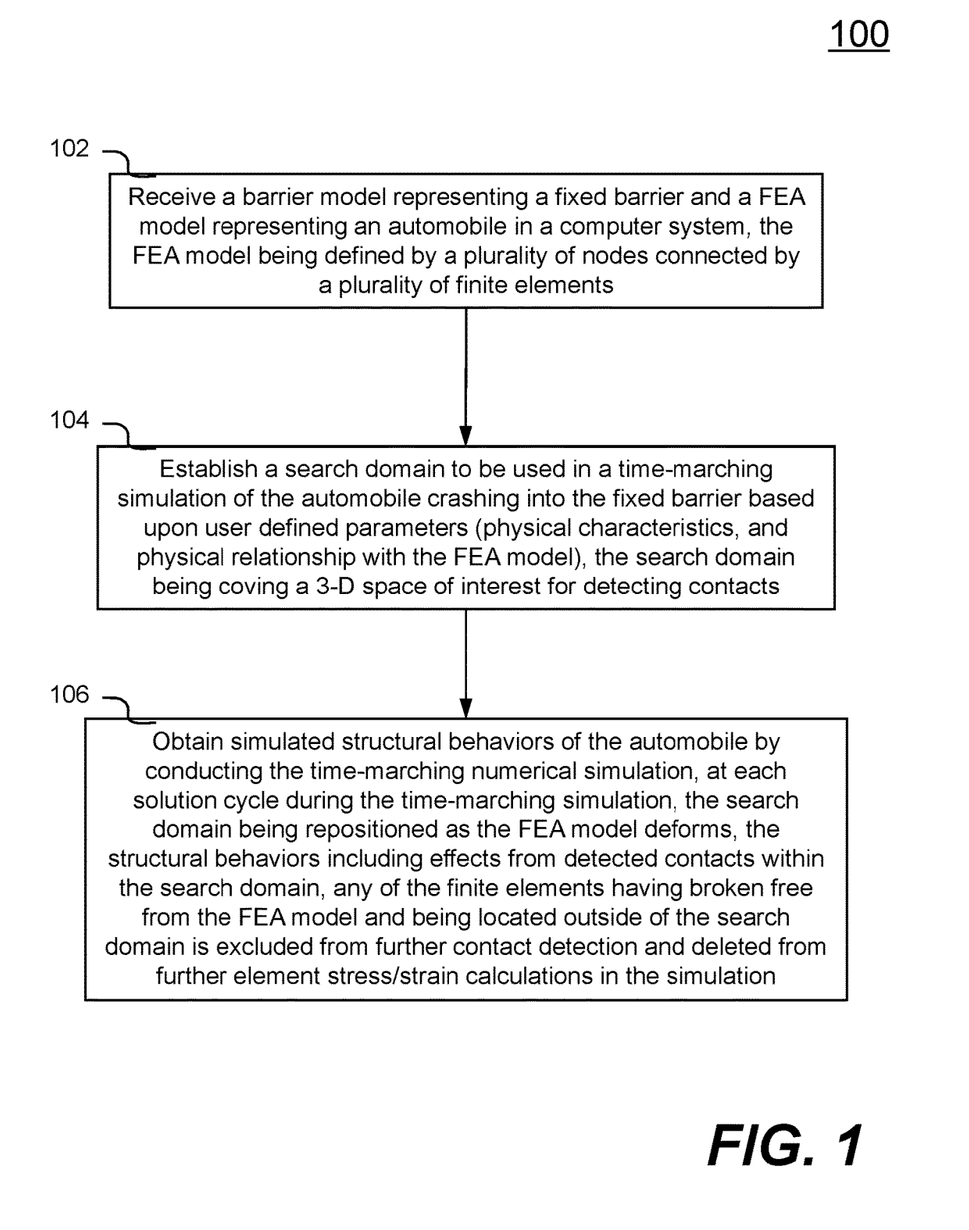
FIG. 1 is a flowchart illustrating an example process of using a dynamically-positioned search domain in a time-marching numerical simulation of an impact event between two objects, according to an embodiment of the invention.

FIG. 1 is a flowchart illustrating an example process 100 of using a dynamically-positioned search domain in a time-marching numerical simulation of an impact event between two objects, according to an embodiment of the invention. Process 100 is preferably understood in conjunction with other figures and is implemented in software.

Figure 6:
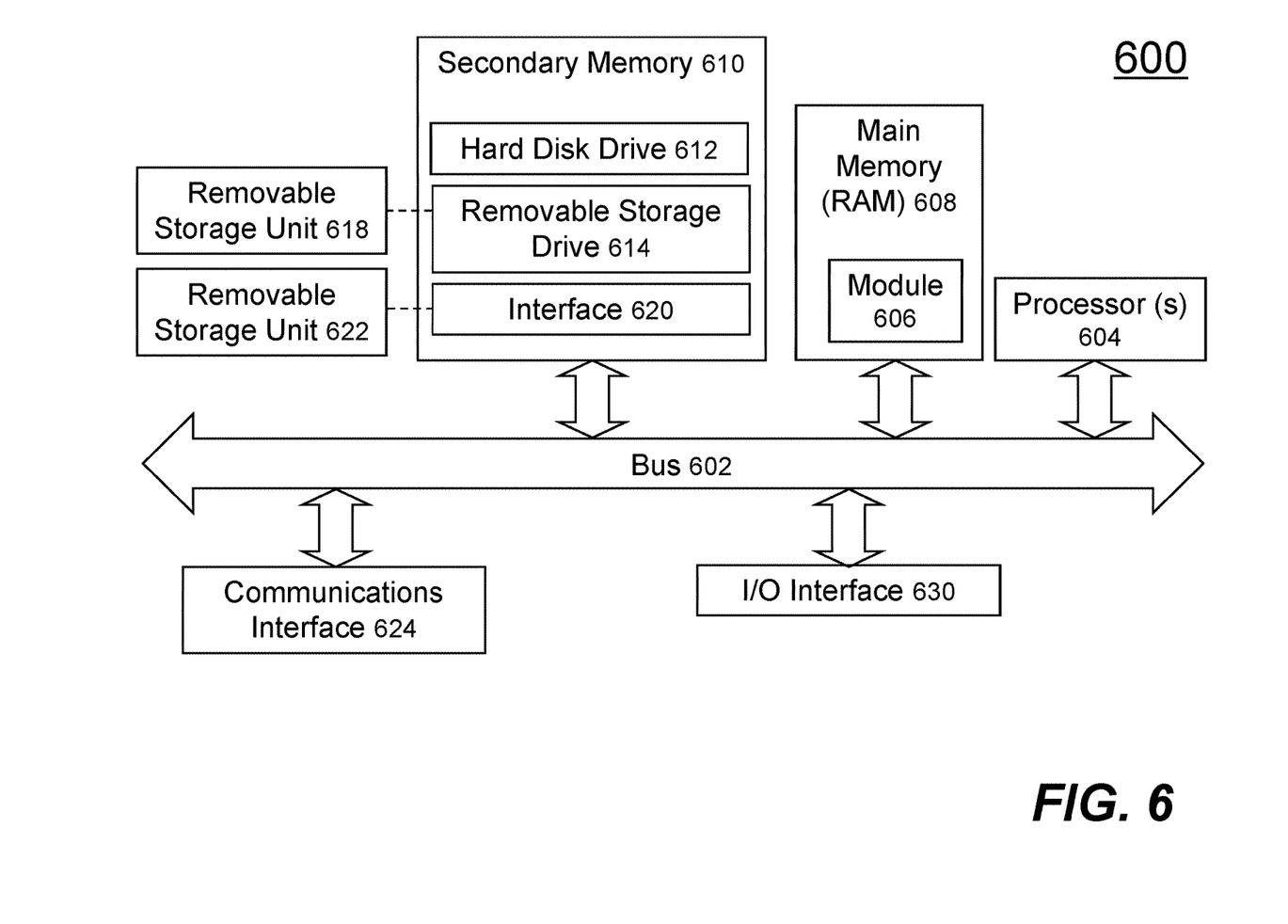
FIG. 6 is a function diagram showing salient components of an example computer system, in which one embodiment of the invention can be implemented.

Process 100 starts at step 102 by receiving a first computerized model representing a first object and a second computerized model representing a second object in a computer system (e.g., computer 600 of FIG. 6). In one embodiment, the first object is a fixed barrier while the second object is an automobile. The second computerized model can be a finite element analysis (FEA) model defined with a number of nodal points connected by finite elements. An application module (e.g., a FEA application module) is installed on the computer system.

Then, at step 104, a search domain to be used in a time-marching simulation of an impact event between the first and second objects is established by the application module based on user-specified parameters. Search domain covers a three-dimensional space of interest for detecting contacts or potential contacts. The three-dimensional space generally covers at least portion of the first computerized model and at least portion of the second computerized model. Contacts can occur between the first and the second objects. Contacts (or sometimes referred to as self contacts) can also occur amongst finite elements of the FEA model. User-specified parameters include the search domain's physical characteristics (i.e., geometric shape, size or dimension) and the search domain's physical location with respect to the second model (i.e., center and orientation). One example impact event is an automobile crashing into a fixed barrier (i.e., the second object crashing into the first object).

Figure 2:
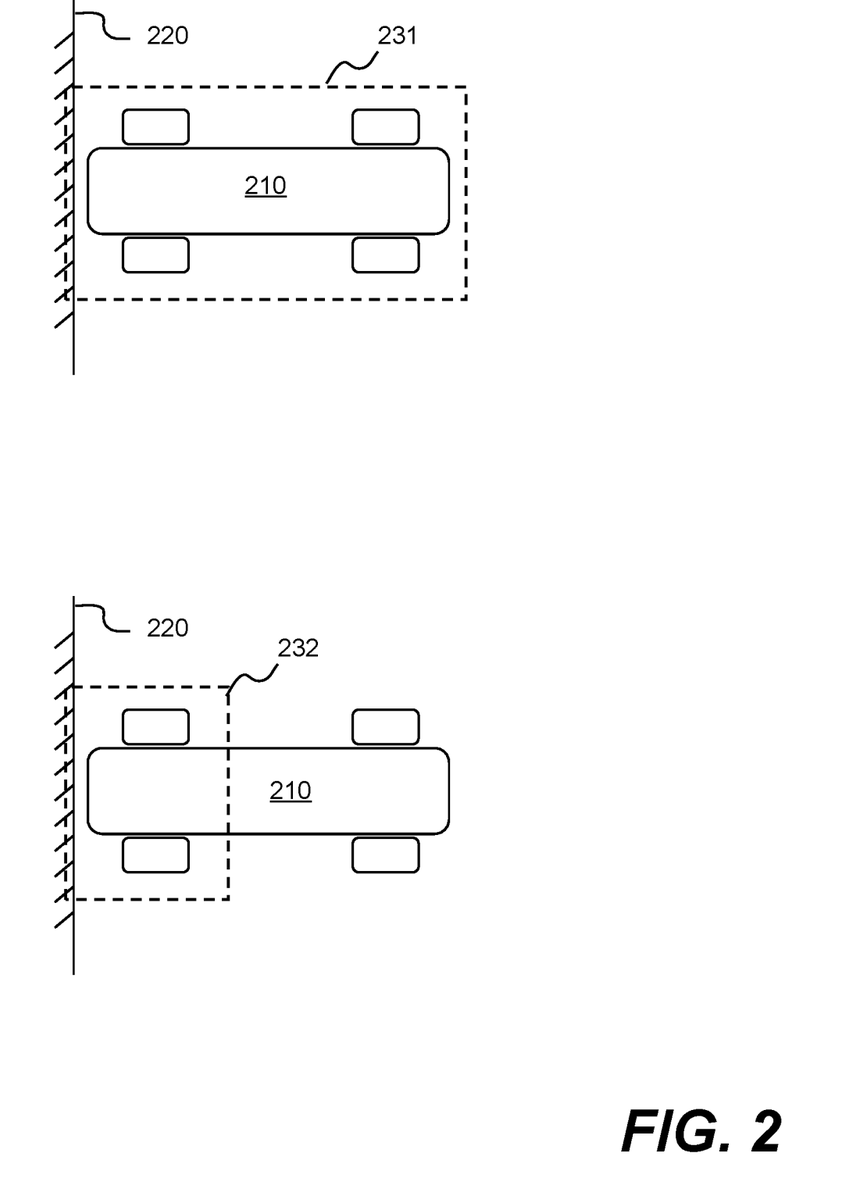
FIG. 2 is a top plan view showing a frontal crash of an automobile into a fixed barrier with two different search domains, according to one embodiment of the invention.

FIG. 2 shows a frontal crash of an automobile 210 into a fixed barrier 220 with two different sizes search domains 231-232. The first search domain 231 covers entire automobile 210 while the second search domain 232 covers only a portion of the automobile 210 and a portion of the barrier 220.

Figure 3:
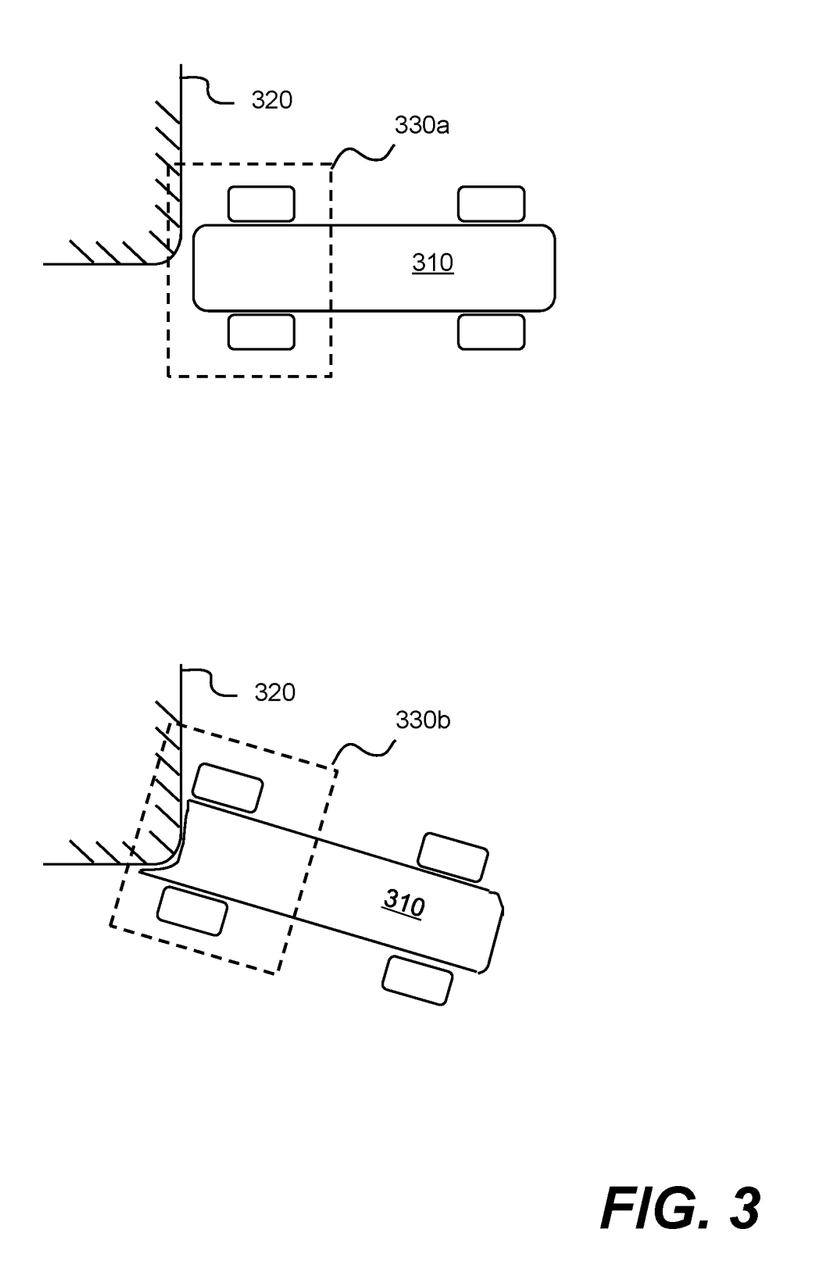
FIG. 3 is a top plan view showing an offset crash of an automobile into a barrier, according to one embodiment of the invention.
Figure 4:
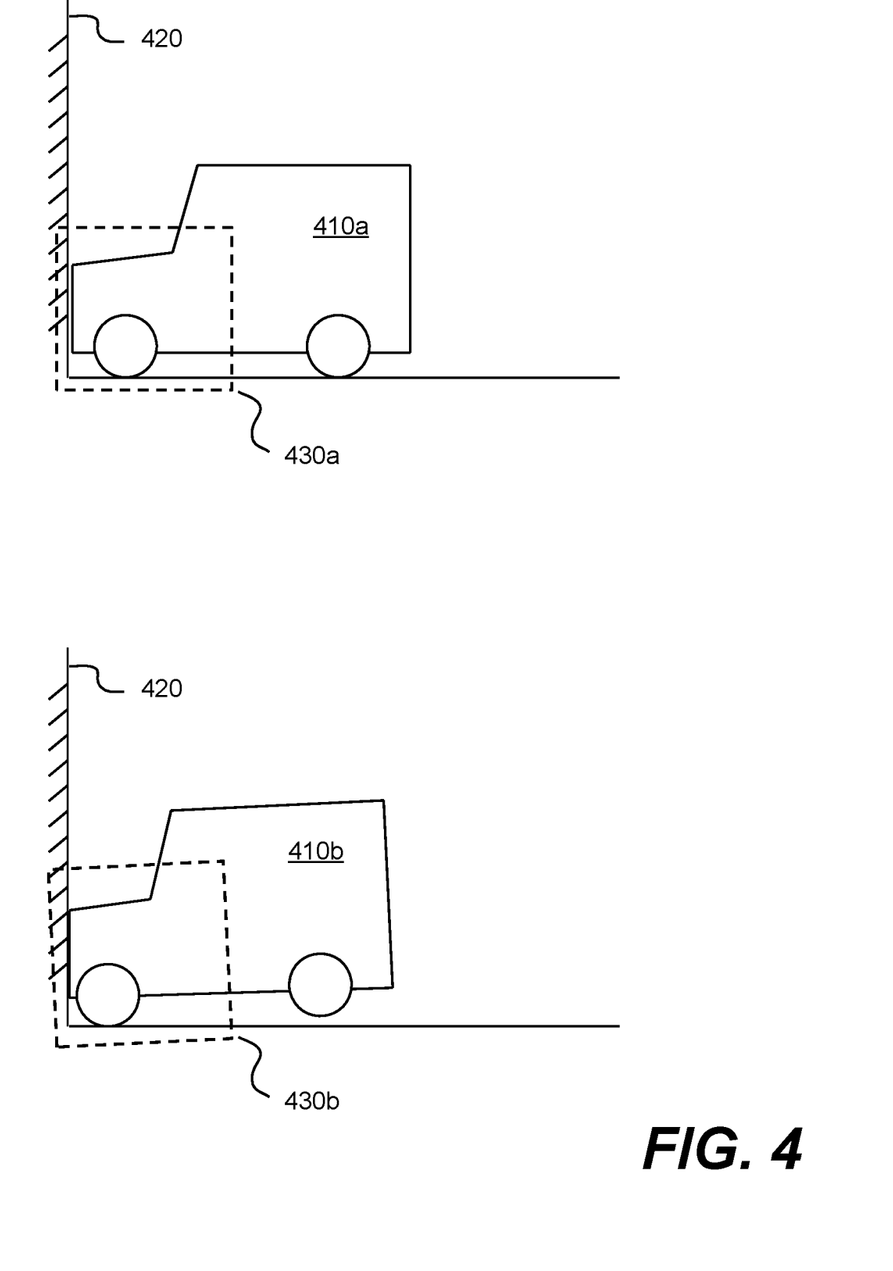
FIG. 4 is a side elevation view showing an impact event of an automobile into a fixed barrier, according to one embodiment of the invention.

FIG. 3 shows an offset crash of an automobile 310 into a fixed barrier 320. Search domain is initially established in a first location 330a and then repositioned to a second location 330b at a later time. Shown in FIG. 4, it is a side elevation view of an automobile 410 crashing into a fixed barrier 420. Search domain is initially at a first position 430a and repositioned at a second position 430b. The search domain is aligned with the deformed automobile. And the size of a search domain remains constant throughout the entire time-marching simulation.

Next, at step 106, simulated structural behaviors are obtained by conducting the time-marching numerical simulation of an impact event between first and second objects. At each solution cycle during the time-marching simulation, the search domain is repositioned as the FEA model deforms. Reposition can be achieved with various means. For example, search domain can be repositioned with a local coordinate system defined with selected nodal points in the FEA model. The local coordinate system would then translate and/or rotate with the nodal points' new locations of the deformed FEA model.

Simulated structural behaviors include effects of detected contacts within search domain. Any debris that has broken free from the FEA model and is located outside the search domain is excluded from further contact consideration, and the finite elements representing the debris are deleted from the calculations (e.g., element stress/strain calculations) in the time-marching simulation to further reduce computational costs. Debris are caused from structural failure due to the impact event. For example, a portion of the engine block or a part of bumper can be fragmented.

Figure 5:
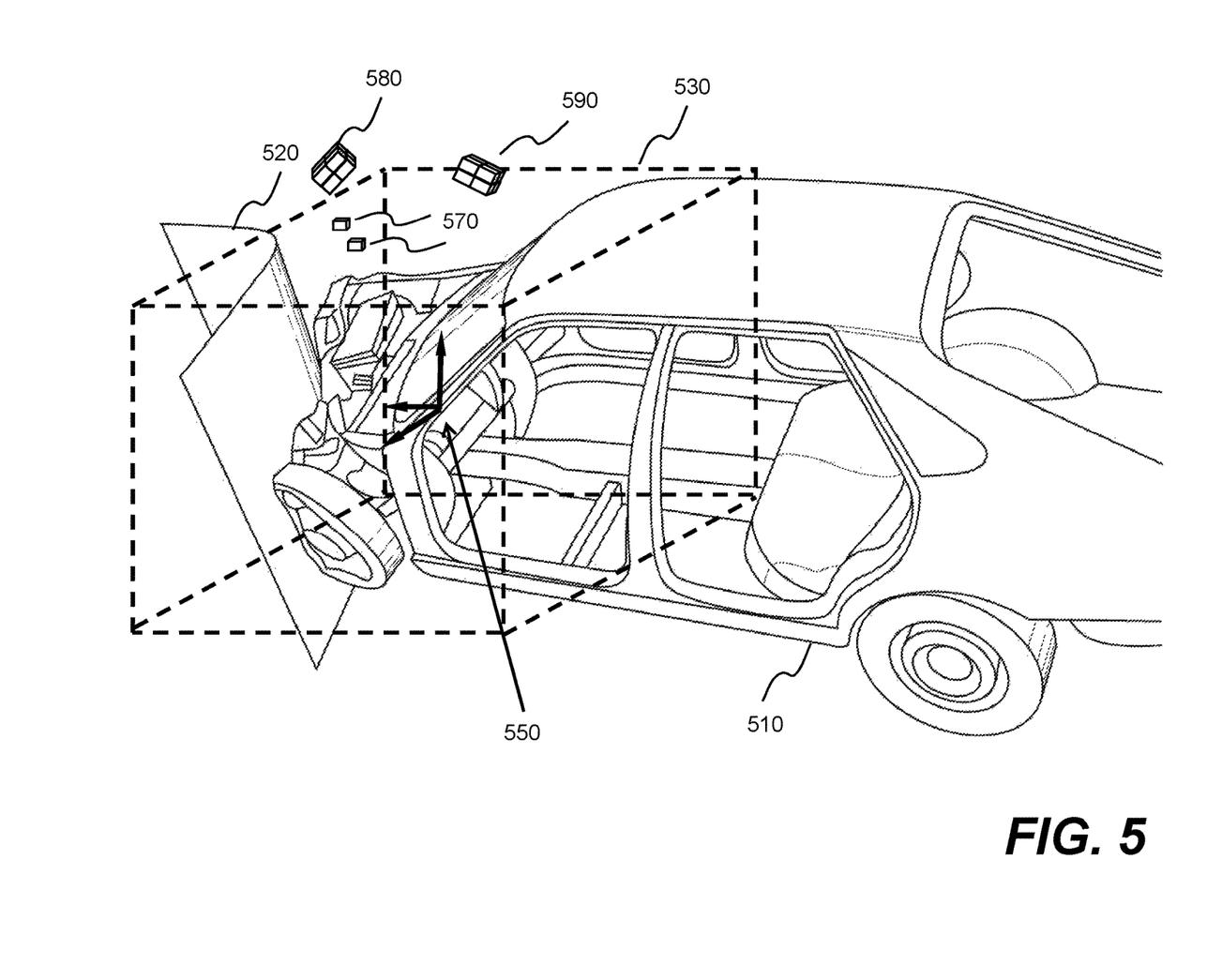
FIG. 5 is a perspective view showing a time-marching simulation result of an automobile crashing into a fixed barrier in an offset crashing event, according to one embodiment of the invention.

FIG. 5 is a perspective view showing a time-marching simulation result of a car crashing into a barrier. In other words, a graphical display of numerical simulation results from a finite element analysis of a numerically simulated impact event. There are two structures included in the simulation: an automobile 510 and a barrier 520. Search domain 530 (shown as a box indicated by dotted lines) is affixed at its center to the automobile 510 and can be repositioned with a local coordinate system 550 (indicated by three thick-line arrows). A few example debris are shown. Debris 570 are located within the search volume 530, while debris 580 is located outside of the search volume 530.

Debris 590 is located on the search volume's boundary. In one embodiment, treatment of debris that intersects the boundary of the search volume can be defined by user, for example, a user-defined input option to include or exclude.

Physical design of the automobile is modified based on the numerically-calculated structural behaviors in order to satisfy the set of crashworthiness criteria. For example, one or more components of the automobile can be changed or adjusted by engineers/scientists with insights gained on the results of the time-marching numerical simulation.

According to one aspect, the invention is directed towards one or more computer systems capable of carrying out the functionality described herein. An example of a computer system 600 is shown in FIG. 6. The computer system 600 includes one or more processors, such as processor 604. The processor 604 is connected to a computer system internal communication bus 602. Various software embodiments are described in terms of this example computer system. After reading this description, it will become apparent to a person skilled in the relevant art(s) how to implement the invention using other computer systems and/or computer architectures.

Computer system 600 also includes a main memory 608, preferably random access memory (RAM), and may also include a secondary memory 610. The secondary memory 610 may include, for example, one or more hard disk drives 612 and/or one or more removable storage drives 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 622 and interfaces 620 which allow software and data to be transferred from the removable storage unit 622 to computer system 600. In general, Computer system 600 is controlled and coordinated by operating system (OS) software, which performs tasks such as process scheduling, memory management, networking and I/O services.

There may also be a communications interface 624 connecting to the bus 602. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. The computer 600 communicates with other computing devices over a data network based on a special set of rules (i.e., a protocol). One of the common protocols is TCP/IP (Transmission Control Protocol/Internet Protocol) commonly used in the Internet. In general, the communication interface 624 manages the assembling of a data file into smaller packets that are transmitted over the data network or reassembles received packets into the original data file. In addition, the communication interface 624 handles the address part of each packet so that it gets to the right destination or intercepts packets destined for the computer 600. In this document, the terms "computer program medium" and "computer usable medium" are used to generally refer to media such as removable storage drive 614, and/or a hard disk installed in hard disk drive 612. These computer program products are means for providing software to computer system 600. The invention is directed to such computer program products.

The computer system 600 may also include an input/output (I/O) interface 630, which provides the computer system 600 to access monitor, keyboard, mouse, printer, scanner, plotter, and alike.

Computer programs (also called computer control logic) are stored as application modules 606 in main memory 608 and/or secondary memory 610. Computer programs may also be received via communications interface 624. Such computer programs, when executed, enable the computer system 600 to perform the features of the invention as discussed herein. In particular, the computer programs, when executed, enable the processor 604 to perform features of the invention. Accordingly, such computer programs represent controllers of the computer system 600.

In an embodiment where the invention is implemented using software, the software may be stored in a computer program product and loaded into computer system 600 using removable storage drive 614, hard drive 612, or communications interface 624. The application module 606, when executed by the processor 604, causes the processor 604 to perform the functions of the invention as described herein.

The main memory 608 may be loaded with one or more application modules 606 that can be executed by one or more processors 604 with or without a user input through the I/O interface 630 to achieve desired tasks. In operation, when at least one processor 604 executes one of the application modules 606, the results are computed and stored in the secondary memory 610 (i.e., hard disk drive 612). The status of the finite element analysis is reported to the user via the I/O interface 630 either in a text or in a graphical representation.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas the three-dimensional space of interest has been shown and described as a box, other geometric shapes can be used for achieving the same, for example a sphere. Further, whereas debris has been shown and described as cubes, other shapes can be represented by one or more finite elements to achieve the same. For example, irregular shape. In summary, the scope of the invention should not be restricted to the specific example embodiments disclosed herein, and all modifications that are readily suggested to those of ordinary skill in the art should be included within the spirit and purview of this application and scope of the appended claims.

I claim:

1. A method comprising: receiving a first computerized model representing a fixed barrier and a second computerized model representing an automobile to be improved according to a set of crashworthiness criteria in a computer system having a finite element analysis (FEA) application module installed thereon, the second computerized model being defined with a plurality of nodal points connected by a plurality of finite elements; establishing, by the FEA application module based upon one or more user-specified parameters, a search domain that covers a three-dimensional space within which contacts between the second computerized model and the first computerized model, and amongst the finite elements of the second computerized model are detected in a time-marching numerical simulation of the second computerized model colliding into the first computerized model in an impact event, said one or more user-specified parameters including the search domain's physical characteristics and the search domain's physical location with respect to the second computerized model; obtaining numerically-calculated structural behaviors of the second computerized model by conducting the time-marching numerical simulation using the FEA application module, at each of a plurality of solution cycles during the time-marching numerical simulation, automatically repositioning the search domain, without any user interaction, to align with a local coordinate system affixed to the second computerized model that moves and rotates in response to detected contacts, physical characteristics of the search domain being constant and unchanged after each repositioning, wherein the numerically-calculated structural behaviors include effects from the detected contacts within the search domain, one or more of the finite elements representing a debris having broken free from the second computerized model and being located outside of the search domain are excluded from further detection and treatment of contacts, whereby the debris is caused by structural failure in the second computerized model due to the impact event; and modifying the automobile based on the numerically-calculated structural behaviors in order to satisfy the set of crashworthiness criteria.

2. The method of claim 1, wherein the physical characteristics of the search domain comprises a geometric shape and a size.

3. The method of claim 1, wherein said repositioning the search domain is accomplished by defining a local coordinate system affixed to one or more of the nodal points of the second computerized model, said local coordinate system causing the search domain to be translated and rotated as said one or more nodal points are at different locations as the second computerized model deforms.

4. The method of claim 1, wherein said detection and treatment of contacts includes detecting contacts and performing element stress/stain calculations.

5. The method of claim 1, said modifying the automobile further comprises changing or adjusting one or more components of the automobile.

6. The method of claim 5, further includes providing a user-defined input option for including or excluding said one or more finite elements that represent the debris, when the debris intersects the search domain's boundary.

7. A system comprising: a main memory for storing computer readable code for a finite element analysis (FEA) application module; at least one processor coupled to the main memory, said at least one processor executing the computer readable code in the main memory to cause the FEA application module to perform operations of: receiving a first computerized model representing a fixed barrier and a second computerized model representing an automobile to be improved according to a set of crashworthiness criteria, the second computerized model being defined with a plurality of nodal points connected by a plurality of finite elements; establishing, based upon one or more user-specified parameters, a search domain that covers a three-dimensional space within which contacts between the second computerized model and the first computerized model, and amongst the finite elements of the second computerized model are detected in a time-marching numerical simulation of the second computerized model colliding into the first computerized model in an impact event, said one or more user-specified parameters including the search domain's physical characteristics and the search domain's physical location with respect to the second computerized model; obtaining numerically-calculated structural behaviors of the second computerized model by conducting the time-marching numerical simulation, at each of a plurality of solution cycles during the time-marching numerical simulation, automatically repositioning the search domain, without any user interaction, to align with a local coordinate system affixed to the second computerized model that moves and rotates in response to detected contacts, physical characteristics of the search domain being constant and unchanged after each repositioning, wherein the numerically-calculated structural behaviors include effects from the detected contacts within the search domain, one or more of the finite elements representing a debris having broken free from the second computerized model and being located outside of the search domain are excluded from further detection and treatment of contacts, whereby the debris is caused by structural failure in the second computerized model due to the impact event; and whereby the automobile is modified based on the numerically-calculated structural behaviors in order to satisfy the set of crashworthiness criteria.

8. The system of claim 7, wherein the physical characteristics of the search domain comprises a geometric shape and a size.

9. The system of claim 7, wherein said repositioning the search domain is accomplished by defining a local coordinate system affixed to one or more of the nodal points of the second computerized model, said local coordinate system causing the search domain to be translated and rotated as said one or more nodal points are at different locations as the second computerized model deforms.

10. The system of claim 7, wherein said detection and treatment of contacts includes detecting contacts and performing element stress/stain calculations.

11. The method of claim 7, further includes providing a user-defined input option for including or excluding said one or more finite elements that represent the debris, when the debris intersects the search domain's boundary.

12. The system of claim 7, further comprises changing or adjusting one or more components of the automobile.

13. A non-transitory computer-readable storage medium containing instructions, when executed in a computer system to perform a method comprising: receiving a first computerized model representing a fixed barrier and a second computerized model representing an automobile to be improved according to a set of crashworthiness criteria in a computer system having a finite element analysis (FEA) application module installed thereon, the second computerized model being defined with a plurality of nodal points connected by a plurality of finite elements; establishing, by the FEA application module based upon one or more user-specified parameters, a search domain that covers a three-dimensional space within which contacts between the second computerized model and the first computerized model, and amongst the finite elements of the second computerized model are detected in a time-marching numerical simulation of the second computerized model colliding into the first computerized model in an impact event, said one or more user-specified parameters including the search domain's physical characteristics and the search domain's physical location with respect to the second computerized model; obtaining numerically-calculated structural behaviors of the second computerized model by conducting the time-marching numerical simulation using the FEA application module, at each of a plurality of solution cycles during the time-marching numerical simulation, automatically repositioning the search domain, without any user interaction, to align with a local coordinate system affixed to the second computerized model that moves and rotates in response to detected contacts, physical characteristics of the search domain being constant and unchanged after each repositioning, wherein the numerically-calculated structural behaviors include effects from the detected contacts within the search domain, one or more of the finite elements representing a debris having broken free from the second computerized model and being located outside of the search domain are excluded from further detection and treatment of contacts, whereby the debris is caused by structural failure in the second computerized model due to the impact event; and modifying the automobile based on the numerically-calculated structural behaviors in order to satisfy the set of crashworthiness criteria.

14. The non-transitory computer-readable storage medium of claim 13, wherein the physical characteristics of the search domain comprises a geometric shape and a size.

15. The non-transitory computer-readable storage medium of claim 13, wherein said repositioning the search domain is accomplished by defining a local coordinate system affixed to one or more of the nodal points of the second computerized model, said local coordinate system causing the search domain to be translated and rotated as said one or more nodal points are at different locations as the second computerized model deforms.

16. The non-transitory computer-readable storage medium of claim 13, wherein said detection and treatment of contacts includes detecting contacts and performing element stress/stain calculations.

17. The non-transitory computer-readable storage medium of claim 13, further includes providing a user-defined input option for including or excluding said one or more finite elements that represent the debris, when the debris intersects the search domain's boundary.

18. The non-transitory computer-readable storage medium of claim 13, said modifying the automobile further comprises changing or adjusting one or more components of the automobile.

* * * * *